United States Patent
Nishino et al.

(10) Patent No.: US 10,780,864 B2
(45) Date of Patent: Sep. 22, 2020

(54) DISC BRAKE

(71) Applicant: HITACHI AUTOMOTIVE SYSTEMS, LTD., Ibaraki (JP)

(72) Inventors: Yusuke Nishino, Minami-Alps (JP); Shinichi Nakayama, Kofu (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 23 days.

(21) Appl. No.: 15/779,169

(22) PCT Filed: Nov. 24, 2016

(86) PCT No.: PCT/JP2016/084712
§ 371 (c)(1),
(2) Date: May 25, 2018

(87) PCT Pub. No.: WO2017/090643
PCT Pub. Date: Jun. 1, 2017

(65) Prior Publication Data
US 2018/0345919 A1    Dec. 6, 2018

(30) Foreign Application Priority Data

Nov. 26, 2015 (JP) ................ 2015-230673

(51) Int. Cl.
*B60T 1/06* (2006.01)
*F16D 55/226* (2006.01)
(Continued)

(52) U.S. Cl.
CPC ............ *B60T 1/065* (2013.01); *F16D 55/225* (2013.01); *F16D 55/226* (2013.01);
(Continued)

(58) Field of Classification Search
CPC .... F16D 55/225; F16D 55/226; F16D 65/097; F16D 65/0977; F16D 2065/1396; F16D 2127/02; F16D 2129/04; F16D 65/0974
(Continued)

(56) References Cited

U.S. PATENT DOCUMENTS 5,249,647 A * 10/1993 Kobayashi ............ F16D 65/092
188/72.3
5,377,790 A * 1/1995 Tsuruta ............... F16D 65/0972
188/205 A
(Continued)

FOREIGN PATENT DOCUMENTS

JP     2010-230042     10/2010
JP     2015-28376      2/2015

OTHER PUBLICATIONS

International Search Report dated Jan. 17, 2017 in International (PCT) Application No. PCT/JP2016/084712.

*Primary Examiner* — Robert A. Siconolfi
*Assistant Examiner* — San M Aung
(74) *Attorney, Agent, or Firm* — Wenderoth, Lind & Ponack, L.L.P.

(57) ABSTRACT

A disc brake includes a caliper; a pad pressed against a disc by a movable portion of the caliper and including a mounting ear portion provided to be protruded in a longitudinal direction of the pad; a pad spring including a guide plate configured to guide the mounting ear portion, and a first biasing member configured to press the mounting ear portion of the pad toward outside of the disc; and a second biasing member provided at the pad to bias the pad in a direction away from the disc. The guide plate of the pad spring has a surface that abuts on the mounting ear portion of the pad pressed by the first biasing member. The pad spring includes a folded region protruded in an axial direction of the disc from the surface abutting on the mounting (Continued)

ear portion of the pad, and folded in a direction toward the outside of the disc and away from the mounting ear portion. The folded region includes an abutting portion which the second biasing member provided at the pad abuts on.

8 Claims, 10 Drawing Sheets

(51) Int. Cl.
*F16D 65/097* (2006.01)
*F16D 55/225* (2006.01)
*F16D 65/02* (2006.01)
*F16D 127/02* (2012.01)
*F16D 129/04* (2012.01)

(52) U.S. Cl.
CPC ....... *F16D 65/097* (2013.01); *F16D 65/0977* (2013.01); *F16D 2065/1396* (2013.01); *F16D 2127/02* (2013.01); *F16D 2129/04* (2013.01)

(58) Field of Classification Search
USPC .......................................... 188/72.3
See application file for complete search history.

(56) References Cited

U.S. PATENT DOCUMENTS

| | | | |
|---|---|---|---|
| 2009/0159376 A1* | 6/2009 | Rossignol | F16D 65/0006 188/73.38 |
| 2010/0187050 A1* | 7/2010 | Hayashi | F16D 65/097 188/72.3 |
| 2010/0243389 A1 | 9/2010 | Miura et al. | |
| 2011/0168503 A1* | 7/2011 | Chelaidite | F16D 65/0972 188/73.31 |
| 2015/0001011 A1* | 1/2015 | Zhang | F16D 65/12 188/72.3 |
| 2015/0247542 A1* | 9/2015 | Yukumi | F16D 55/2265 188/72.3 |

* cited by examiner

DISC BRAKE

TECHNICAL FIELD

The present invention relates to a disc brake configured to apply a braking force to a vehicle.

BACKGROUND ART

In general, a disc brake provided on a vehicle such as a motor vehicle is mounted to a non-rotary part of the vehicle and is configured to include a mounting member that is formed across an outer circumferential side of a disc, a caliper that is mounted to the mounting member and that is formed across the outer circumferential side of the disc; a pair of pads that are pressed against respective surfaces of the disc by a movable portion of the caliper; pad springs that are mounted to the mounting member and that are provided between the mounting member and the pair of pads; and return springs that are mounted to the pads to bias the respective pads in directions away from the disc. The pad spring includes an abutting portion which a leading end of the return spring abuts on (Patent Literature 1).

CITATION LIST

Patent Literature

PTL 1: JP 2015-28376A

SUMMARY OF INVENTION

Technical Problem

In the pad spring of the related art described above, an abutting portion which the leading end of the return spring abuts on and a guide portion serving to facilitate mounting of the pad to the mounting member in a pad assembling process are provided separately. This is likely to increase the material width of the pad spring and complicate processing of the pad spring.

An object of the present disclosure is accordingly to provide a disc brake that improves the yield of a pad spring and reduces the cost.

Solution to Problem

According to one embodiment of the present disclosure, there is provided a disc brake including a mounting member that is mounted to a non-rotary part of a vehicle and that is formed across an outer circumferential side of a disc; a caliper that is mounted to the mounting member and that is formed across the outer circumferential side of the disc; a pad that is pressed against the disc by a movable portion of the caliper and that includes a mounting ear portion provided to be protruded in a longitudinal direction of the pad; a pad spring that includes a guide plate configured to guide the mounting ear portion, and a first biasing member configured to press the mounting ear portion of the pad toward outside of the disc; and a second biasing member that is provided at the pad to bias the pad in a direction away from the disc. The guide plate of the pad spring has a surface that abuts on the mounting ear portion of the pad pressed by the first biasing member. The pad spring includes a folded region that is protruded in an axial direction of the disc from the surface abutting on the mounting ear portion of the pad and that is folded in a direction toward the outside of the disc and away from the mounting ear portion. The folded region includes an abutting portion which the second biasing member provided at the pad abuts on.

This embodiment of the present invention improves the yield of the pad spring and thereby reduces the cost of the disc brake.

DESCRIPTION OF EMBODIMENTS

The following describes the disc brake according to embodiments in detail with reference to accompanied drawings.

Figure 1:
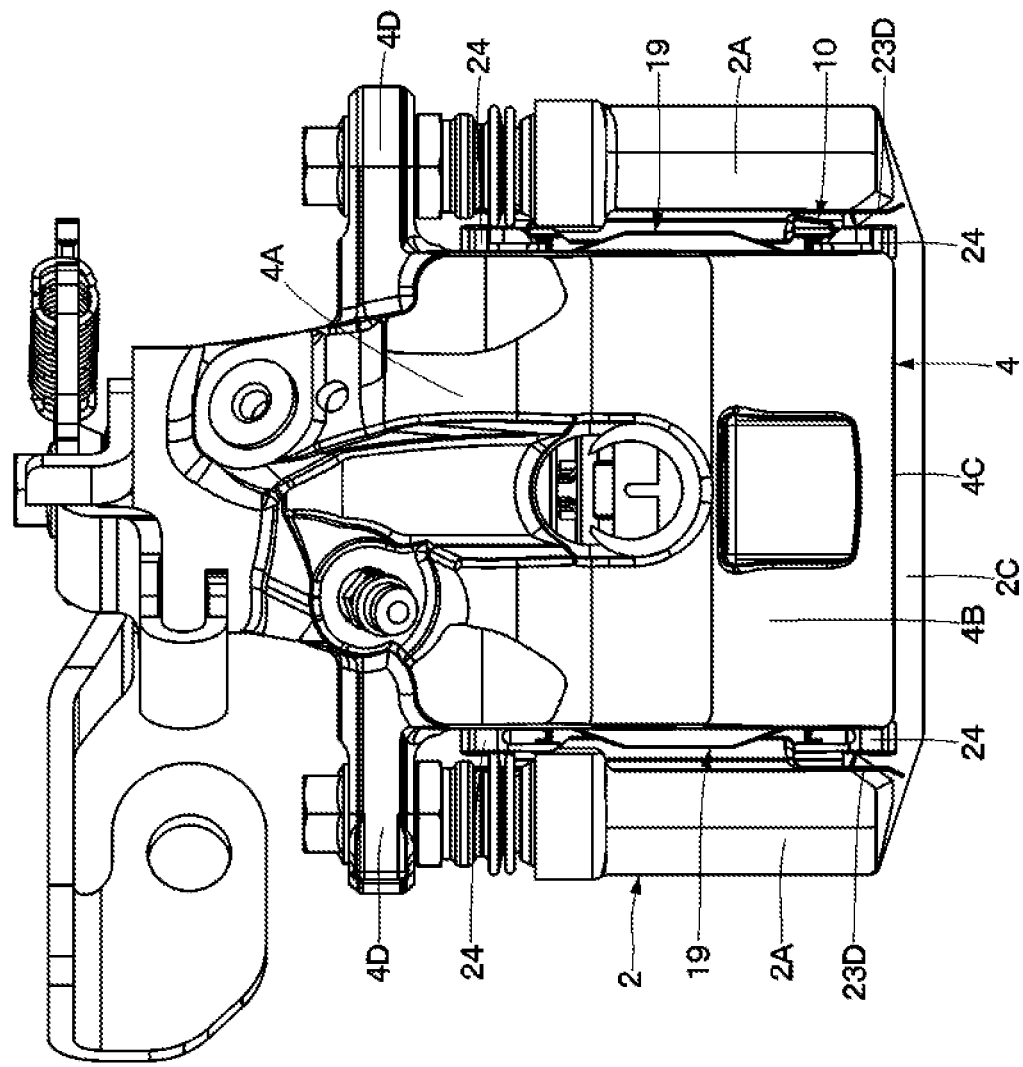
FIG. 1 is a plan view illustrating a disc brake according to a first embodiment, viewed from outside in a radial direction of a disc.
Figure 2:
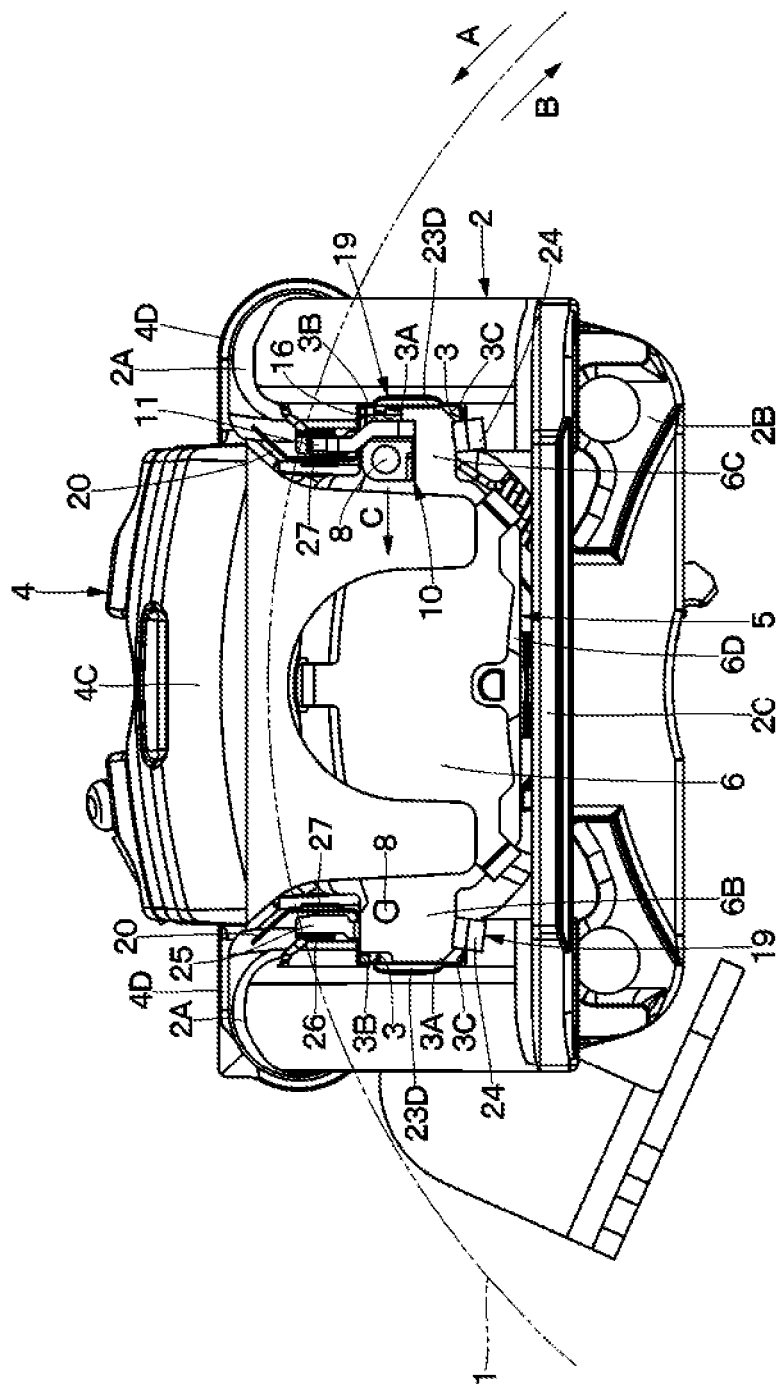
FIG. 2 is a front view illustrating the disc brake, viewed from an outer side.

FIG. 1 to FIG. 11 illustrate a first embodiment of the present invention. A disc 1 configured to rotate along with a wheel (not shown) is rotated in a direction of an arrow A, for example, when a vehicle moves forward and is rotated in a direction of an arrow B when the vehicle moves rearward (as shown in FIG. 2).

A mounting member 2 called carrier is mounted to a non-rotary part (not shown) of the vehicle and is formed across an outer circumferential side of the disc 1. The mounting member 2 is configured to include a pair of arm portions 2A and 2A, a supporting portion 2B and a reinforcing beam 2C. The respective arm portions 2A and 2A are provided to be away from each other in a rotating direction of the disc 1 (leftward and rightward directions of FIGS. 1 and 2 that are called rotating direction of the disc 1 or circumferential direction of the disc 1 in the application hereof) and are extended in an axial direction of the disc 1 (upward and downward directions of FIG. 1 and forward and rearward directions of FIG. 2) to be across the outer circumference of the disc 1.

The supporting portion 2B is provided to integrate and connect base ends of the respective arm portions 2A with each other and is fixed at a position on the inner side of the disc 1 to the non-rotary part of the vehicle. The reinforcing beam 2C is placed at a position on the outer side of the disc 1 to couple leading end sides of the respective arm portions 2A with each other. Accordingly, the respective arm portions 2A of the mounting member 2 are integrally coupled with each other by the supporting portion 2B on the inner side of the disc 1 and are integrally coupled with each other by the reinforcing beam 2C on the outer side.

A disc pass portion (not shown) is formed in a middle part of each of the arm portions 2A of the mounting member 2 in the axial direction of the disc 1 to be extended in an arc shape along the outer circumference of the disc 1 (rotation trajectory). Inner-side and outer-side guide portions 3 (only the outer-side guide portions are illustrated) are formed on respective sides of the disc pass portion of the mounting member 2 (on the respective sides in the axial direction of the disc 1). In other words, the mounting member 2 is provided with the guide portions 3 that are located on the respective sides in the rotating direction of the disc 1 and that respectively serve as supporting portions on the inner side and on the outer side.

The guide portion 3 includes a bottom portion 3A provided (on one side or on the other side) in the rotating direction of the disc 1 and a first wall portion 3B and a second wall portion 3C that are provided on the respective sides of the bottom portion 3A or more specifically on the respective sides in the radial direction of the disc 1. The guide portions 3 are parts which mounting ear portions 6B and 6C of a pad 5 are inserted in. The first wall portion 3B is located on the outside in the radial direction of the disc 1 (on the outer diameter side), and the second wall portion 3C is located on the inside in the radial direction of the disc 1 (on the inner diameter side). In other words, the first wall portion 3B and the second wall portion 3C are provided on the upper side and on the lower side of FIG. 2 to be away from each other and to be parallel to each other. The guide portion 3 is formed by the bottom portion 3A, the first wall portion 3B and the second wall portion 3C as a concave groove (recessed groove) extended in the axial direction of the disc 1.

The guide portions 3 are configured such that the mounting ear portions 6B and 6C of a back board 6 included in the pad 5 are placed between the first wall portions 3B on the upper side and the second wall portions 3C on the lower side (in the radial direction of the disc 1) and that the pad 5 between these wall portions 3B and 3C is guided in the axial direction of the disc 1. The bottom portions 3A of the guide portions 3 serve as so-called torque receiving parts to receive a braking torque applied to the pad 5 from the disc 1 at the time of a brake operation, via the mounting ear portions 6B and 6C of the pad 5 and guide plates 23 of pad springs 19 described later.

More specifically, out of the left and right guide portions 3, 3 of the mounting member 2 shown in FIG. 2, the guide portion 3 (bottom portion 3A thereof) on the left side in the drawing that is located on an outlet side in the rotating direction (hereinafter referred to as turn-out side) of the disc 1 rotating in the direction of the arrow A receives the braking torque applied to the pad 5 from the disc 1 at the time of a brake operation during a forward movement of the vehicle, via the mounting ear portion 6B of the back board 6 of the pad 5 and the guide plate 23 of the pad spring 19. The guide portion 3 (bottom portion 3A thereof) on the right side in the drawing that is located on an inlet side in the rotating direction (hereinafter referred to as turn-in side) of the disc 1 rotating in the direction of the arrow A, on the other hand, receives the braking torque applied to the pad 5 from the disc 1 at the time of a brake operation during a rearward movement of the vehicle (when the disc 1 is rotated in the direction of the arrow B), via the mounting ear portion 6C of the back board 6 of the pad 5 and the guide plate 23 of the pad spring 19.

A caliper 4 is mounted to the mounting member 2 and is formed across the outer circumferential side of the disc 1. The caliper 4 includes an inner leg portion 4A, a bridge portion 4B and an outer leg portion 4C. The inner leg portion 4A is provided on the inner side that is one side in the axial direction of the disc 1. The bridge portion 4B is extended from the inner leg portion 4A toward the outer side that is the other side in the axial direction of the disc 1 to be across the outer circumferential side of the disc 1 between the respective arm portions 2A of the mounting member 2. The outer leg portion 4C is extended inward in the radial direction of the disc 1 from the outer side that is a leading end side of the bridge portion 4B and has a bifurcated claw on its leading end side.

Figure 3:
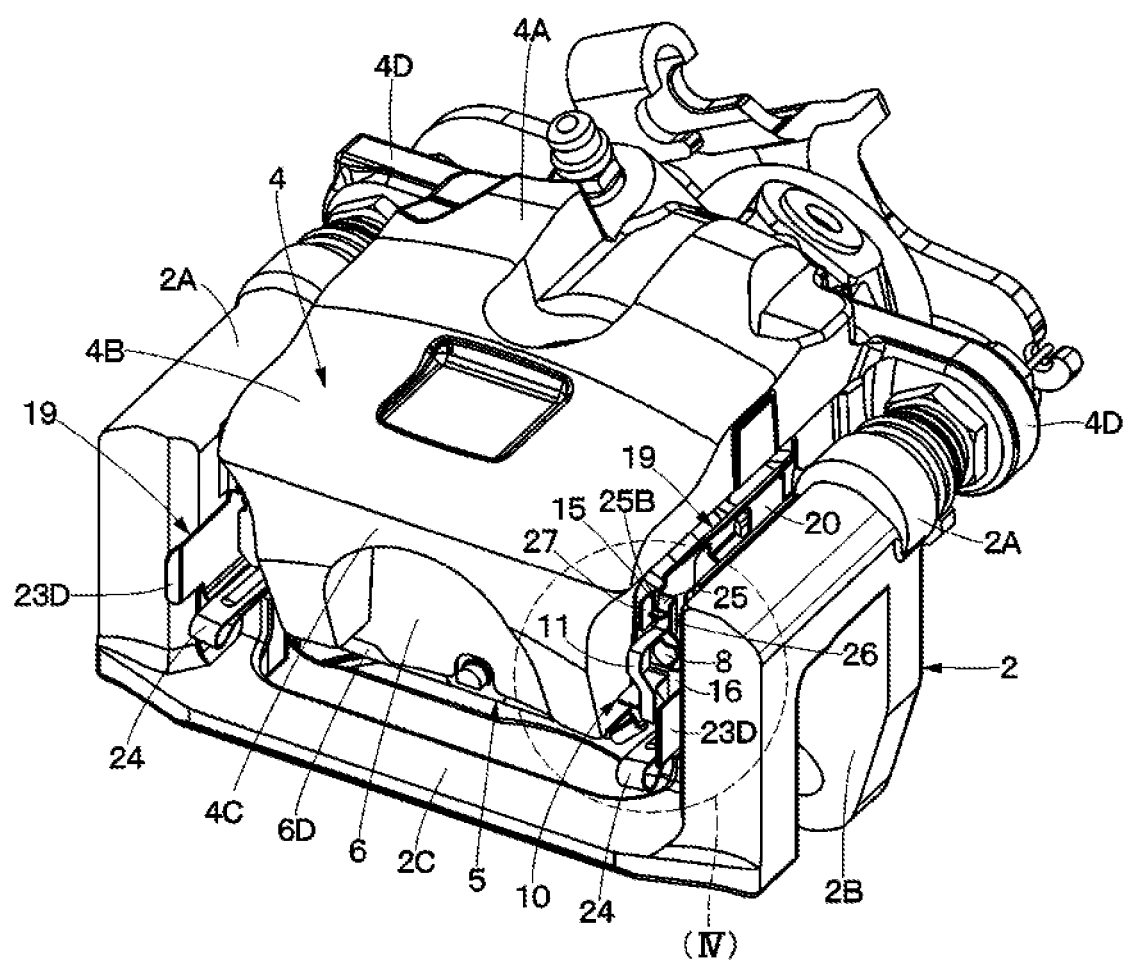
FIG. 3 is a perspective view illustrating the disc brake, viewed diagonally downward from right in FIG. 2.

One cylinder (not shown) of, for example, a single bore is provided in the inner leg portion 4A of the caliper 4. A piston is inserted slidably in this cylinder. As shown in FIGS. 1 to 3, a pair of mounting portions 4D, 4D are provided integrally with the inner leg portion 4A to be protruded in the rotating direction of the disc 1. The respective mounting portions 4D, 4D serve to slidably support the entire caliper 4 via sliding pins (not shown) to the respective arm portions 2A of the mounting member 2.

Figure 11:
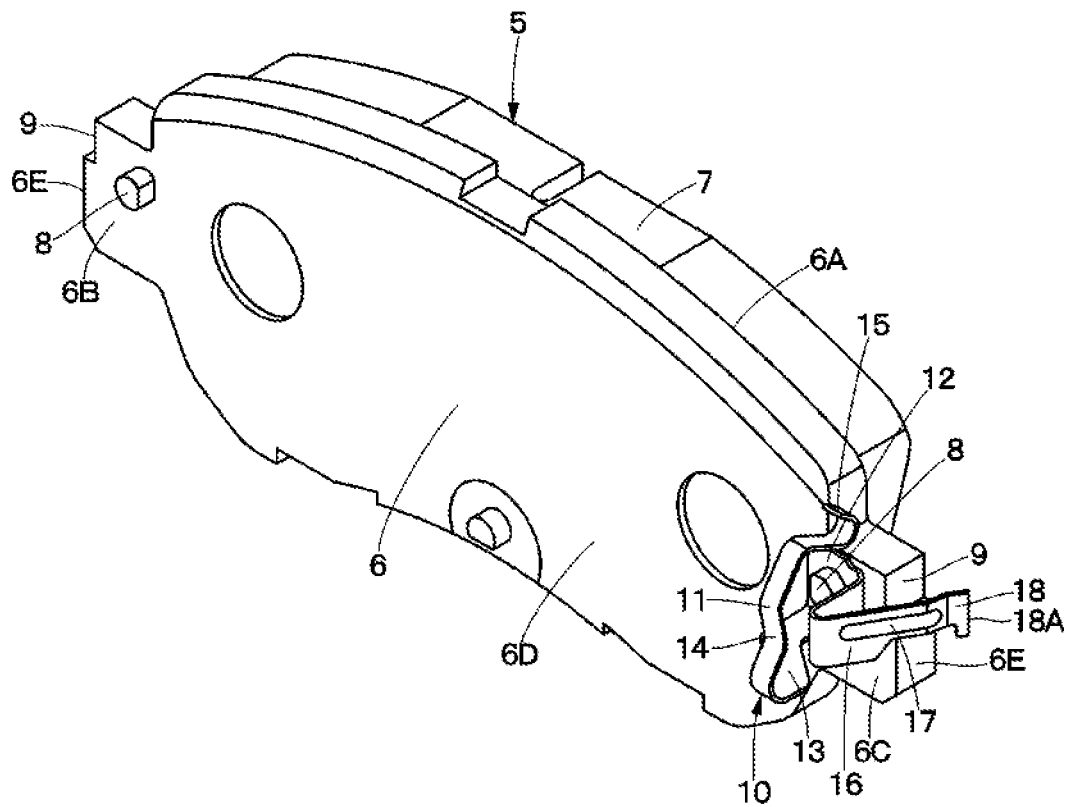
FIG. 11 is a perspective view illustrating a state that a spring assembly is mounted to the pad.

Inner-side and outer-side pads 5, 5 are placed to be opposed to respective side faces in the axial direction of the disc 1. The respective pads 5 are mounted to the mounting member 2 to be movable in the axial direction of the disc 1 and are pressed against the respective surfaces of the disc 1 by movable parts (the piston and the outer leg portion 4C) of the caliper 4. As shown in FIG. 11, each of the pads 5 is configured to include a flat plate-like back board 6 that is extended in the rotating direction of the disc 1 and a lining 7 that is joined with (fastened to) a disc opposed face 6A of the surfaces of the back board 6 and that serves as a friction material in friction contact with the surface (side face in the axial direction) of the disc 1. The back board 6 may be made of, for example, a metal or a resin.

The mounting ear portions 6B and 6C in convex shapes are located at side edges of the back board 6 of the pad 5 on the respective sides in the rotating direction of the disc 1 to be protruded from the back board 6 of the pad 5. The respective mounting ear portions 6B and 6C are slidably inserted (fitted) in the guide portions 3 of the mounting member 2 via the respective guide plates 23 of the pad springs 19 described later. The respective mounting ear portions 6B and 6C form a torque transmission portion configured to transmit the braking torque applied to the pad 5 from the disc 1 at the time of a brake operation of the vehicle, to the guide portions 3 (bottom portions 3A thereof) of the mounting member 2.

The mounting ear portions 6B and 6C of the pad 5 (back board 6) are formed to be symmetrical to each other and to have an identical shape. One mounting ear portion 6C is located on the inlet side in the rotating direction (turn-in side) of the disc 1 rotating in the direction of the arrow A during a forward movement of the vehicle, and the other mounting ear portion 6B is located on the outlet side in the rotating direction (turn-out side) of the disc 1. A spring assembly 10 including a return spring 11 and a side pressure spring 16 described later is mounted to one mounting ear portion 6C located on the turn-in side of the disc 1 out of the two mounting ear portions 6B and 6C. According to the embodiment, the spring assembly 10 is provided only on the turn-in side of the disc 1 and is not provided on the turn-out side. The spring assembly 10 may, however, be also provided on the turn-out side as needed basis.

The back board 6 of the pad 5 has projections 8, 8 that are respectively located close to the base end (root) sides of the respective mounting ear portions 6B and 6C. Each of these projections 8 is provided to be protruded on a rear face 6D side (on a face opposite to the disc opposed face 6A provided with the lining 7, i.e., rear face) of the back board 6 and is formed in, for example, a non-circular (segmental circular) cross sectional shape. One projection 8 located on the turn-in side of the disc 1 out of the two projections 8 is provided to position the spring assembly 10 relative to the back board 6 as described later. Accordingly, the spring assembly 10 is engaged with (swaged to) one projection 8.

The respective mounting ear portions 6B and 6B of the back board 6 have steps 9, 9 that are formed on respective opposed faces 6E that are opposed to the bottom portions 3A of the guide portions 3. The respective steps 9 are formed by partly cutting, in an L shape, the respective opposed faces 6E that are end faces on the respective leading end sides (protruded sides) of the mounting ear portions 6B and 6C. Each of the steps 9 is arranged at a position closer to the outside in the radial direction than the center position in the width direction of the mounting ear portion 6B or 6C (in the radial direction of the disc 1).

The step 9 located on the turn-in side of the disc 1 out of the two steps 9 forms a space for receiving part of the side pressure spring 16 that is integrally formed with the return spring 11 as described later. The side pressure spring 16 is placed on this step 9 to be protruded in the axial direction of the disc 1. In this configuration, part of a vibration portion 18 that is a leading end of the side pressure spring 16 is placed between the disc opposed face 6A of the back board 6 and the disc 1. According to the embodiment, the leading end of the side pressure spring 16 also serves as a wear detector of the lining 7 and is accordingly extended to between the disc opposed face 6A and the disc 1. When the leading end does not serve as the wear detector, however, the leading end may not be extended to between the disc opposed face 6A and the disc 1.

The following describes the spring assembly 10 mounted to the pad 5. The spring assembly 10 is configured by integrally forming the return spring 11 that biases the pad 5 in a return direction to be away from the disc 1, with the side pressure spring 16 that biases the pad 5 in the rotating direction of the disc 1 (toward the turn-out side). The side pressure spring 16 also serves as a wear notification member that gives the driver or the like an alarm for the time to replace the pad 5 (i.e., the wear limit of the lining 7).

As shown in FIG. 11, the spring assembly 10 is formed as an integrally-formed metal spring member having three functions as a whole, by the return spring 11 having a function of returning the pad 5 to a return position away from the disc 1 (return function) and the side pressure spring 16 having two functions, i.e., a function of pressing the pad 5 in the rotating direction of the disc 1 (toward the turn-out side) (side pressing function) and a function of giving an alarm for the wear limit of the lining 7 (wear detecting function). According to the embodiment, the configuration of the spring assembly 10 as the integrally-formed metal spring member having three functions reduces the cost and improves the assembly efficiency. This configuration is, however, not restrictive. The spring assembly may be configured to include three members having respectively different functions or may be configured to include a return spring having only the return function with omission of the side pressing function and the wear detecting function.

The spring assembly 10 is provided at the side edge on the disc turn-in side (on the mounting ear portion 6C) during a forward movement of the vehicle out of the respective side edges (mounting ear portions 6B and 6C) of the back board 6 included in the pad 5 provided on the inner side or on the outer side. The spring assembly 10 includes the return spring 11 and the side pressure spring 16 that are integrally formed by bending a spring material taken from a metal plate having spring properties, such as a stainless steel plate, by press forming or another technique. The spring assembly 10 on the inner side and the spring assembly 10 on the outer side are formed symmetrical about the disc 1 (plane symmetry) but otherwise have identical configurations. The following mainly describes the spring assembly 10 on the outer side.

The return spring 11 included in the spring assembly 10 is provided between the pad 5 and the mounting member 2 or more specifically between the mounting ear portion 6C on the disc turn-in side and the pad spring 19 mounted to the mounting member 2. The return spring 11 biases the pad 5 in a direction away from the disc 1 and is formed with the side pressure spring 16 by folding the metal plate spring material. The return spring 11 is configured as the second biasing member according to the embodiment.

The return spring 11 is configured to have a base end side that is fixed to the back board 6 of the pad 5 and a leading end side that elastically abuts on the mounting member 2 side on the more outside in the radial direction of the disc 1 than the base end side. The return spring 11 continuously biases the pad 5 (back board 6) in the return direction away from the disc 1 and stably returns the pad 5 to the return position (initial position, standby position), for example, when the brake operation of the vehicle is released. The return spring 11 is configured to include a fixed portion 12, a first extended portion 13, a second extended portion 14 and a curved portion 15.

The flat plate-like fixed portion 12 is swaged and fixed to the projection 8 on the mounting ear portion 6C-side of the pad 5 (back board 6) to make positioning including the rotating direction. A non-circular swaging hole which the projection 8 provided on the mounting ear portion 6C is to be inserted and fit in is formed at the approximate center of the fixed portion 12. This embodiment illustrates the example that the spring assembly 10 is swaged and fixed. The configuration is, however, not limited to this example. The spring assembly 10 may be clamped to be fixed to the respective mounting ear portions 6B and 6C of the back board 6 of the pad 5. The fixation method may be designed appropriately.

The first extended portion 13 is folded in an L shape to stand perpendicularly from the fixed portion 12 and has a leading end side that is extended in a direction perpendicularly away from the surface of the disc 1. The second extended portion 14 is folded in acute angle or at right angle (approximately 45 degrees to 90 degrees) outward in the radial direction of the disc 1 from the leading end side of the first extended portion 13 and in a direction approaching an abutting portion 25B of the pad spring 19 and is extended outward in the radial direction of the disc 1 toward the abutting portion 25B of the pad spring 19. The curved portion 15 is folded at approximately right angle (70 to 90 degrees) from a leading end side of the second extended portion 14 toward the abutting portion 25B of the pad spring 19 and has a leading end side that is folded back in a U shape. The curved portion 15 abuts on the abutting portion 25B of the pad spring 19, so as to elastically deform the second extended portion 14.

Figure 4:
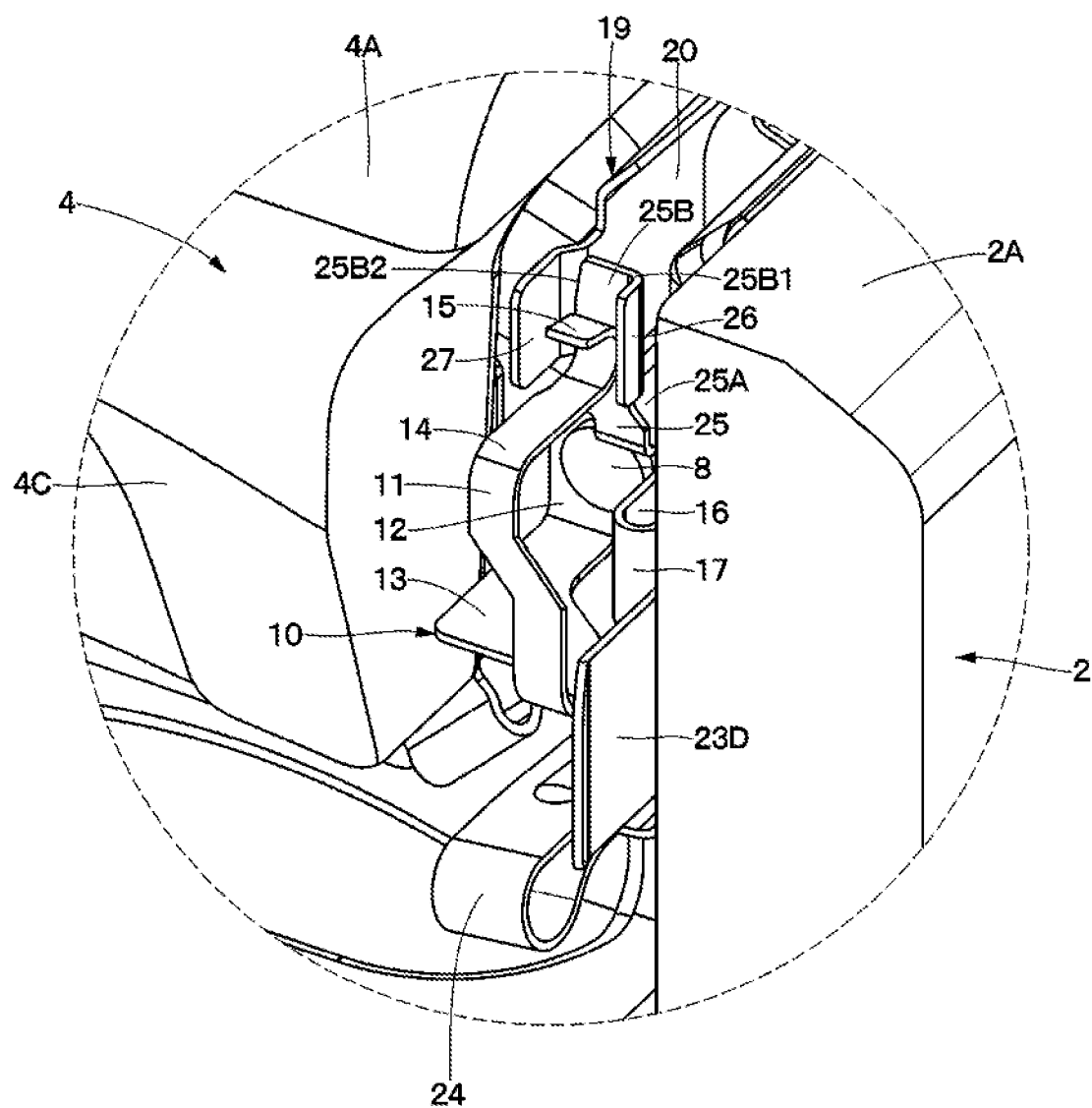
FIG. 4 is an enlarged view illustrating a region (IV) in FIG. 3.
Figure 5:
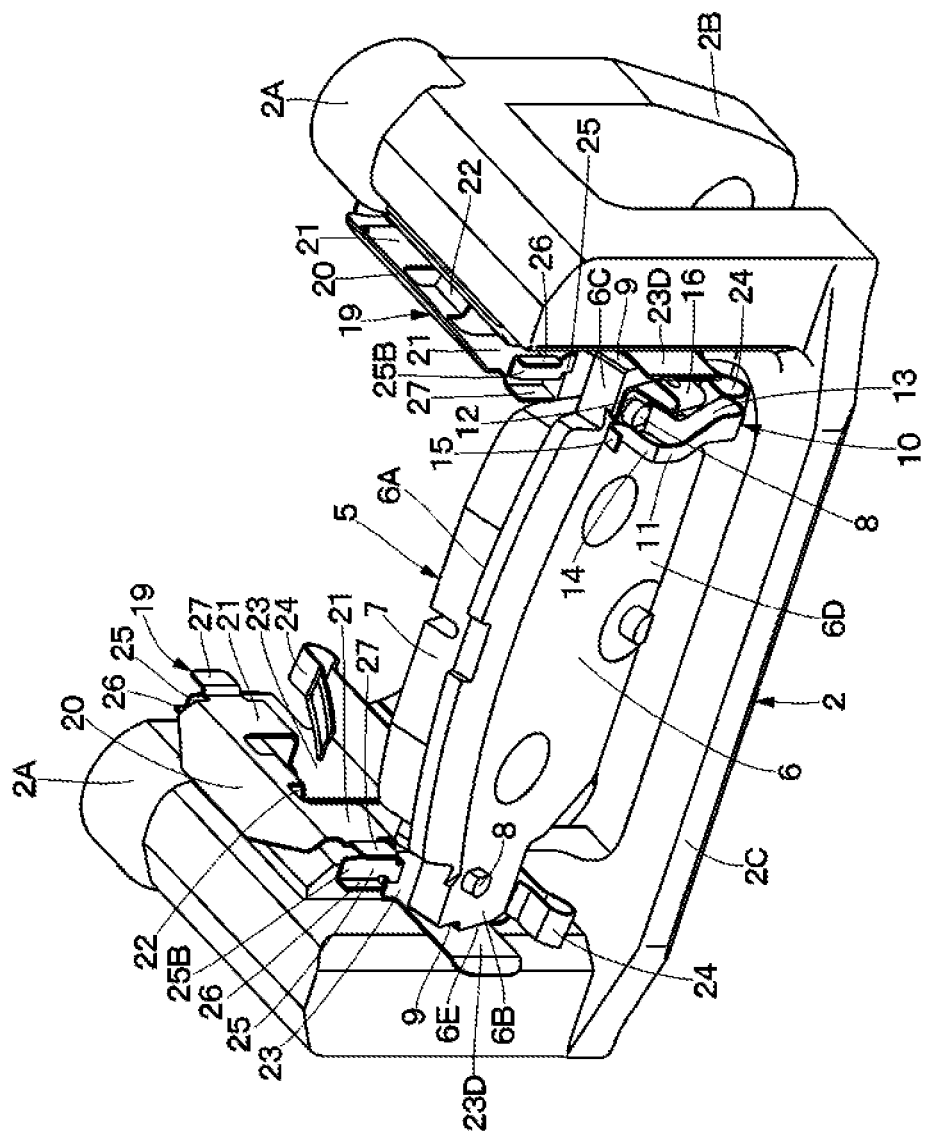
FIG. 5 is a perspective view illustrating a mounting member, a pad spring and a pad in a process of assembling the pad to the mounting member.

As shown in FIG. 4, the curved portion 15 is located between a first side bent portion 26 and an axial direction protruded portion 27 of the pad spring 19 and abuts on the abutting portion 25B of the pad spring 19. Even when the curved portion 15 is misaligned from the abutting portion 25B by, for example, application of an external force to the return spring 11, the first side bent portion 26 and the axial direction protruded portion 27 serve to suppress the curved portion 15 from coming off from the abutting portion 25B. The return spring 11 accordingly causes the pad 5 to be stably away from the disc 1 and thereby improves the reliability of the disc brake.

The following describes the side pressure spring 16 integrally provided with the return spring 11.

The side pressure spring 16 and the return spring 11 constitute the spring assembly 10. The side pressure spring 16 is provided between the mounting ear portion 6C on the disc turn-in side during a forward movement of the vehicle and the bottom portion 3A of the guide portion 3 of the mounting member 2 opposed thereto. The side pressure spring 16 has a pressing function of biasing the guide portion 3 and pressing the pad 5 in the rotating direction of the disc 1 toward the turn-out side of the disc 1. The side pressure spring 16 also serves to give the driver or the like an alarm for the wear limit of the lining 7 by making a sound when a leading end of the side pressure spring 16 placed between the back board 6 of the pad 5 and the disc 1, i.e., the vibration portion 18 (a leading end 18A thereof), comes into contact with the disc 1.

Accordingly, the side pressure spring 16 is configured to include the fixed portion 12 that is shared with the return spring 11, a pressing portion 17, and the vibration portion 18. The fixed portion 12, the pressing portion 17 and the vibration portion 18 are formed integrally. The pressing portion 17 is folded from the fixed portion 12 toward the rear face 6D-side of the back board 6 to have a U-shaped cross section. The pressing portion 17 abuts in an elastically deformed state on (elastically comes into contact with) the bottom portion 3A of the guide portion 3 of the mounting member 2 via the guide plate 23 of the pad spring 19. Accordingly, the pressing portion 17 elastically comes into contact with the bottom portion 3A via the pad spring 19 and thereby biases the pad 5 in the rotating direction of the disc 1 or more specifically toward the turn-out side of the disc 1.

The vibration portion 18 included in the side pressure spring 16 is extended from a leading end side of the pressing portion 17 toward the disc 1. When the lining 7 of the pad 5 is worn to a predetermined location (wear limit), the leading end 18A of the vibration portion 18 comes into contact with the side face in the axial direction (surface) of the disc 1 and vibrates, so as to make a sound (abnormal noise).

The wear of the lining 7 causes the disc opposed face 6A of the back board 6 to approach the disc 1 during braking and accordingly causes the leading end 18A of the vibration portion 18 to come into contact with the side face of the disc 1 and vibrate, so as to make a sound. This configuration accordingly gives the driver or the like an alarm for the time to replace the pad 5 (alarm for the wear limit of the lining 7).

The following describes the pad spring 19.

The pad springs 19, 19 are respectively mounted to the respective arm portions 2A of the mounting member 2. Each of the pad springs 19 is placed between the mounting member 2 and the pad 5 on the inner side or the pad 5 on the outer side to elastically support the pad 5 and smoothen a sliding displacement of the pad 5. The pad spring 19 is formed by bending (press-forming) a metal plate having spring properties, such as stainless steel plate.

As shown in FIGS. 6 to 10, the pad spring 19 is integrally formed to include a connecting plate 20, flat plates 21, an engagement plate 22, guide plates 23, radial direction biasing plates 24, and folded regions 25. The connecting plate 20 is extended in the axial direction of the disc 1 across the outer circumferential side of the disc 1, in order to integrally connect the respective guide plates 23 on the inner side and on the outer side of the disc 1.

The flat plates 21, 21 are extended inward in the radial direction of the disc 1 on the respective ends in the longitudinal direction of the connecting plate 20 and are integrally formed with the connecting plate 20. In other words, the flat plate 21 is coupled with the guide plate 23 and is extended outward in the radial direction of the disc 1. The flat plate 21 is provided with the axial direction protruded portion 27 that is protruded in the axial direction of the disc 1 as described later.

The engagement plate 22 is located between the pair of flat plates 21, 21, is formed integrally with the connecting plate 20, and is mounted to the mounting member 2 such as to be engaged inward in the radial direction of the disc 1 with the disc pass portion of the arm portion 2A. This configuration positions the pad spring 19 relative to the arm portion 2A of the mounting member 2 in the axial direction of the disc 1 and prevents the pad spring 19 from being displaced in the rotating direction of the disc 1.

The pair of guide plates 23, 23 are provided on the respective ends of the connecting plate 20 via the respective flat plates 21. Each of the guide plates 23 is folded in a shape following the guide portion 3 (approximately U shape) from an inner end side of the flat plate 21 in the radial direction of the disc 1. One guide plate 23 out of the pair of guide plates 23 is fit in the guide portion 3 on the inner side, and the other guide plate 23 is fit in the guide portion 3 on the outer side. Each of the guide plates 23 serves to guide the back board 6 of the pad 5 in the axial direction of the disc 1 via the mounting ear portion 6B or 6C of the convex shape.

Accordingly, the guide plates 23 are mounted so as to be able to abut on the guide portions 3 (not necessarily fully abut on the guide portions 3 but may be opposed to the guide portions 3 across clearances). More specifically, the guide plate 23 includes an outside portion 23A that is a region to abut on (or to be opposed to) the first wall portion 3B of the guide portion 3, an inside portion 23B that is a region to abut on (or to be opposed to) the second wall portion 3C of the guide portion 3, and an interior wall portion 23C that is a region located between the outside portion 23A and the inside portion 23B to abut on (or to be opposed to) the bottom portion 3A of the guide portion 3.

Additionally, the guide plate 23 is provided with a guide projection 25A (described later) that is extended from the outside portion 23A toward a side away from the disc 1 in the axial direction of the disc 1 and an extended portion 23D that is extended from the interior wall portion 23C toward the side away from the disc 1 in the axial direction of the disc 1. The extended portion 23D serves to elastically deform the side pressure spring 16 and introduce the side pressure spring 16 toward the guide portion 3 of the mounting member 2 in the process of assembling the pad 5 to the mounting member 2.

This configuration smoothly guides the mounting ear portion 6C on the turn-in side of the pad 5 toward the guide portion 3 along the guide projection 25A and the extended portion 23D in the process of mounting the pad 5 with the spring assembly 10 attached thereto to the mounting member 2 with the pad spring 19 attached thereto. This accordingly improves the assembly efficiency of the pad 5.

The radial direction biasing plate 24 is integrally formed with an inside region of each guide plate 23 that is on the inside in the radial direction of the disc 1. The radial direction biasing plate 24 is configured as the first biasing member according to the embodiment. Each radial direction biasing plate 24 is extended in the axial direction of the disc 1 from the inside region of the guide plate 23 that is on the inside in the radial direction of the disc 1, i.e., from the inside portion 23B located on the second wall portion 3C-side of the guide portion 3, is folded back in an arc shape, and is extended to an inside region of the mounting ear portion 6B or 6C that is on the inside in the radial direction of the disc 1, such that a leading end of the radial direction biasing plate 24 abuts on the mounting ear portion 6B or 6C of each pad 5 (back board 6).

Each radial direction biasing plate 24 elastically abuts on the mounting ear portion 6B or 6C of each pad 5 (back board 6) in each guide portion 3 of the mounting member 2 and biases the back board 6 of each pad 5 outward in the radial direction of the disc 1, i.e., toward the first wall portion 3B of the guide portion 3. In other words, each radial direction biasing plate 24 that is mounted to the guide portion 3 of the mounting member 2 is located on the second wall portion 3C-side that is one wall portion side of the guide portion 3 and is provided between the pad 5 and the second wall portion 3C or more specifically between the mounting ear portion 6B or 6C and the inside portion 23B of the guide plate 23, so as to press the mounting ear portion 6B or 6C toward the first wall portion 3B-side that is the other wall portion side. Each radial direction biasing plate 24 accordingly causes the mounting ear portion 6B or 6C of each pad 5 to abut on the outside portion 23A of the guide plate 23. This configuration smoothly guides the pad 5 along the guide plate 23 in the axial direction of the disc 1 during a braking operation, while suppressing rattling of each pad 5.

The folded region 25 is provided on the surface (outside portion 23A) that abuts on the mounting ear portion 6B or 6C of the pad 5 pressed by the radial direction biasing plate 24. The folded region 25 is formed by the guide projection 25A that is extended from the outside portion 23A of the guide plate 23 toward the side away from the disc 1 in the axial direction of the disc 1, and the abutting portion 25B that is bent from a leading end of the guide projection 25A outward in the radial direction of the disc 1.

Figure 6:
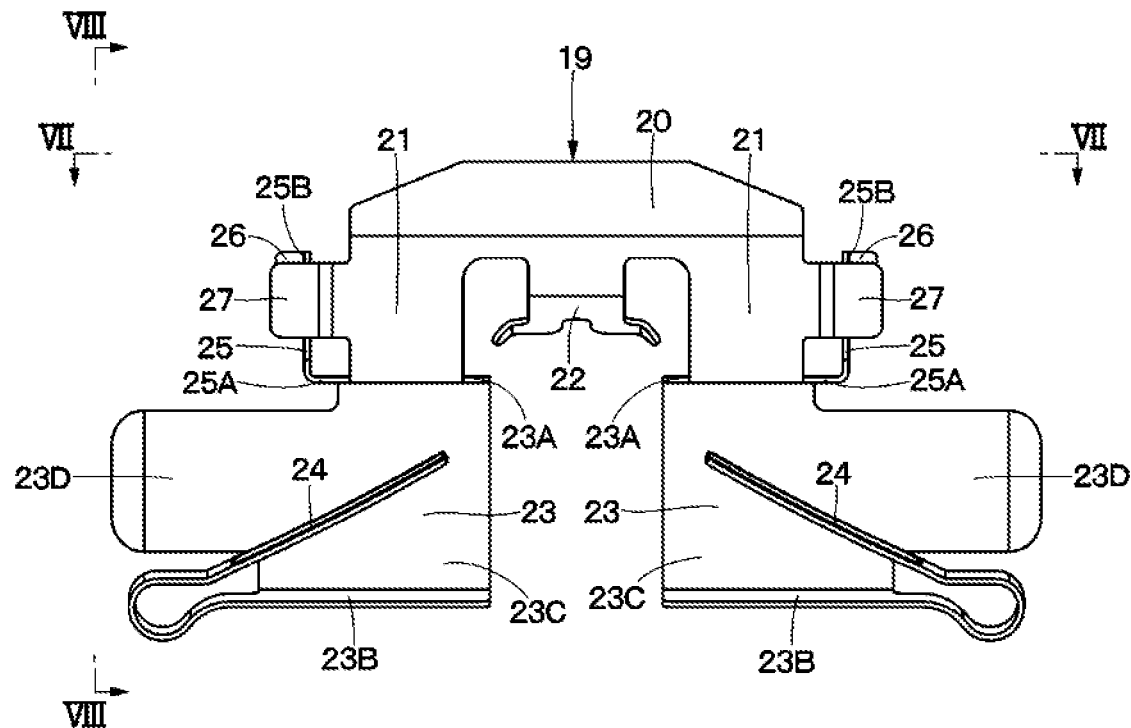
FIG. 6 is a front view illustrating the pad spring alone.
Figure 7:
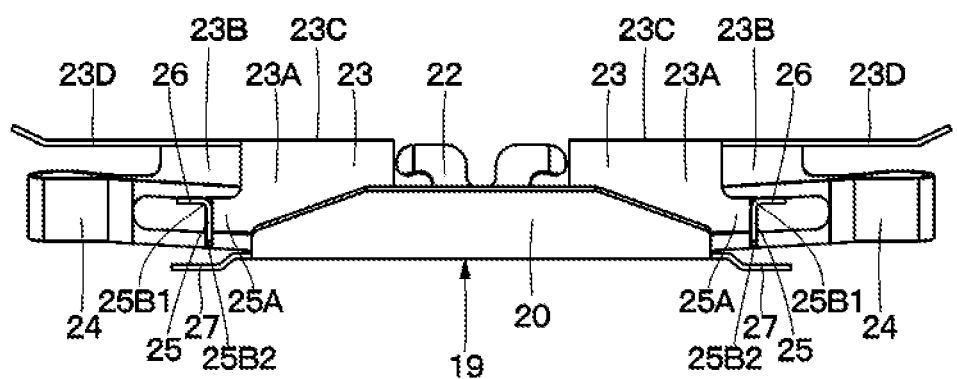
FIG. 7 is a plan view illustrating the pad spring in FIG. 6 viewed from a direction of an arrow VII-VII.
Figure 8:
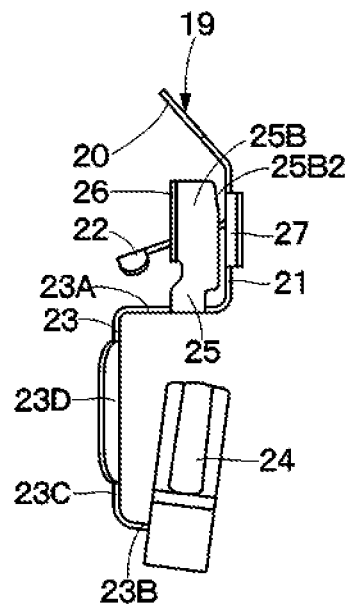
FIG. 8 is a side view illustrating the pad spring in FIG. 6 viewed from a direction of an arrow VIII-VIII.
Figure 9:
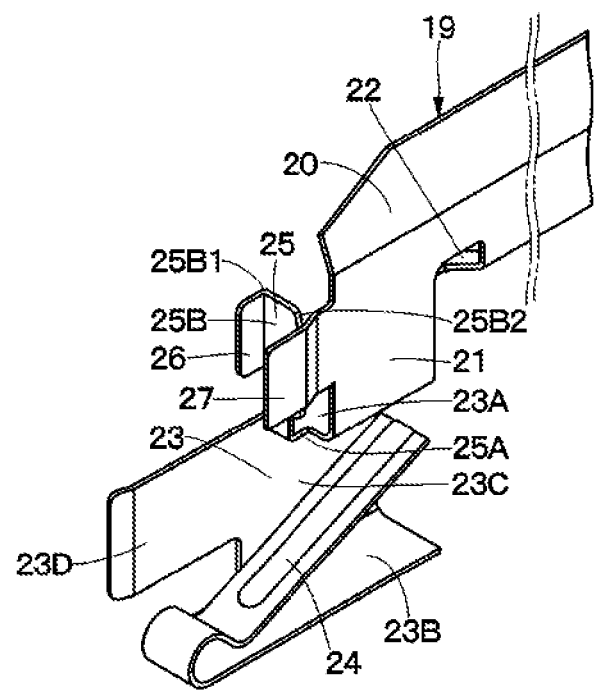
FIG. 9 is a perspective view illustrating half of the pad spring on an inner side or on an outer side.
Figure 10:
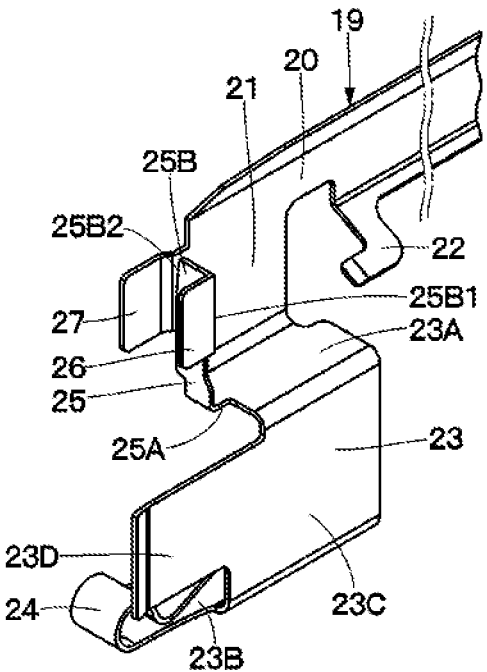
FIG. 10 is a perspective view illustrating the pad spring in FIG. 9, viewed from a rear side.

The guide projection 25A abuts on an outside surface (upper face) of the mounting ear portion 6B or 6C of the pad 5 that is on the outside in the radial direction of the disc 1 and guides the mounting ear portion 6B or 6C in the axial direction of the disc 1, in the process of assembling the pad 5 to the mounting member 2 with the pad spring 19 attached thereto. As shown in FIG. 6, the folded region 25 is extended to a position that is slightly protruded to the outside in the radial direction of the disc 1 from the axial direction protruded portion 27 as described later.

The abutting portion 25B is located on a leading end side of the folded region 25 (on the outside in the radial direction of the disc 1). This abutting portion 25B is provided at a position that is further away from the disc 1 than the guide plate 23. The abutting portion 25B accordingly abuts on the curved portion 15 of the return spring 11 and elastically deforms the second extended portion 14 of the return spring 11. The elastic force of the return spring 11 is adjustable by regulating the projection length of the guide projection 25A that is protruded from the outside portion 23A of the guide plate 23 outward in the axial direction of the disc 1.

The folded region 25 is formed in a generally L shape by the guide projection 25A and the abutting portion 25B. When the curved portion 15 of the return spring 11 abuts on the abutting portion 25B, the folded region 25 is elastically deformed in the axial direction of the disc 1 (in the direction approaching the disc 1). The folded region 25 accordingly plays an auxiliary role of the return spring 11 when the pad 5 is separated away from the disc 1.

The first side bent portion 26 is formed by bending the abutting portion 25B at its outside end 25B1 (abutting surface end) that is on the outside in the circumferential direction of the disc 1 (i.e., on the opposite side to the center side of the disc brake shown in FIG. 2, on the side away from the caliper 4, on the side away from the piston). The first side bent portion 26 is configured as the side bent portion according to the embodiment. The first side bent portion 26 is bent and extended from the outside end 25B1 of the abutting portion 25B toward the side away from the disc 1 in the axial direction of the disc 1 to be opposed to the axial direction protruded portion 27 (described later) that is located on an inside end 25B2-side of the abutting portion 25B. In the state that the curved portion 15 of the return spring 11 abuts on the abutting portion 25B, the first side bent portion 26 is located on the outside of the curved portion 15 in the circumferential direction of the disc 1, i.e., at a position further away from the curved portion 15 in the disc circumferential direction than the center portion of the pad 5 in the disc circumferential direction.

This configuration suppresses the curved portion 15 of the return spring 11 from coming off from the outside of the abutting portion 25B in the circumferential direction of the disc 1, for example, when the return spring 11 is elastically deformed by the wear of the lining 7. This configuration also suppresses the curved portion 15 of the return spring 11 from coming off from the abutting portion 25B by the contact with the first side bent portion 26, even when an external force is applied to the return spring 11, for example, during assembly or transportation of the disc brake.

The axial direction protruded portion 27 is protruded from the flat plate 21 outward in the axial direction of the disc 1. The axial direction protruded portion 27 is located on the side closer to the center of the pad 5 (i.e., on the center side of the disc brake shown in FIG. 2, on the side approaching the caliper 4, on the side approaching the piston) than the inside end 25B2 of the abutting portion 25B in the circumferential direction of the disc 1. The axial direction protruded portion 27 is protruded to a position that is further away from the disc 1 than the abutting portion 25B in the axial direction of the disc 1. The axial direction protruded portion 27 is accordingly opposed to the first side bent portion 26 across the abutting portion 25B. In the state that the curved portion 15 of the return spring 11 abuts on the abutting portion 25B, the axial direction protruded portion 27 is accordingly located on the inside of the curved portion 15 in the circumferential direction of the disc 1 or more specifically at a position closer to the disc circumferential center of the pad 5 than the curved portion 15 in the disc circumferential direction.

This configuration suppresses the curved portion 15 of the return spring 11 from coming off from the inside of the abutting portion 25B in the circumferential direction of the disc 1, for example, when the return spring 11 is elastically deformed by the wear of the lining 7. This configuration also suppresses the curved portion 15 of the return spring 11 from coming off from the abutting portion 25B by the contact with the axial direction protruded portion 27, even when an external force is applied to the return spring 11, for example, during assembly or transportation of the disc brake.

As described above, the guide plate 23 of the pad spring 19 is provided with the folded region 25 which includes the guide projection 25A configured to guide the mounting ear portion 6B or 6C of the pad 5 and the abutting portion configured to abut on the curved portion 15 of the return spring 11. This configuration enhances the yield of the pad spring 19 and thereby reduces the cost of the disc brake.

The following describes the operations of the disc brake having the above configuration according to the first embodiment.

At the time of a brake operation of the vehicle, a brake hydraulic pressure is supplied to the inner leg portion 4A (cylinder) of the caliper 4. This slidably displaces the piston toward the disc 1 and presses the pad 5 on the inner side against one side face of the disc 1. In this state, the caliper 4 receives a pressing reactive force from the disc 1. This slidably displaces the entire caliper 4 to the inner side relative to the arm portion 2A of the mounting member 2 and causes the outer leg portion 4C to press the pad 5 on the outer side against the other side face of the disc 1.

This configuration causes the disc 1 rotating, for example, in the direction of the arrow A shown in FIG. 2 (during a forward movement of the vehicle) to be firmly held from both sides in the axial direction between the pad 5 on the inner side and the pad 5 on the outer side, and applies the braking force to this disc 1. When the brake operation is released, the supply of the hydraulic pressure to the piston is stopped. This causes the pad 5 on the inner side and the pad 5 on the outer side to be away from the disc 1 and to be returned to the non-braking state. At this time, the pad 5 on the inner side and the pad 5 on the outer side are stably returned by the return spring 11 to the return position away from the disc 1 (initial position, standby position).

At the time of a brake operation and at the time of a release (to the non-braking state), the mounting ear portion 6C located on the turn-in side of the disc 1 out of the mounting ear portions 6B and 6C of the pad 5 is biased in the direction of an arrow C shown in FIG. 2 by the pressing portion 17 of the side pressure spring 16. The pad 5 is continuously biased by a weak force toward the turn-out side of the disc 1 (in the direction of the arrow A shown in FIG. 2). The mounting ear portion 6B located on the turn-out side of the disc 1 is elastically pressed against the bottom portion 3A of the guide portion 3 via the guide plate 23 of the pad spring 19 by this biasing force.

Accordingly, the side pressure spring 16 provided between the mounting ear portion 6C on the turn-in side of the disc 1 and the bottom portion 3A suppresses the pad 5 from rattling in the rotating direction of the disc 1 due to vibration or the like during a run of the vehicle. At the time of a brake operation during a forward movement of the vehicle, the arm portion 2A on the turn-out side (bottom portion 3A of the guide portion 3) receives the braking torque (rotational torque in the direction of the arrow A) applied to the pad 5 from the disc 1.

This configuration causes the mounting ear portion 6B of the pad 5 located on the turn-in side of the disc 1 to keep abutting on the bottom portion 3A of the guide portion 3 via the guide plate 23. Moreover, the mounting ear portion 6B on the turn-out side abuts on the guide plate 23 by the biasing force of the pressing portion 17 of the side pressure spring 16 prior to a brake operation to have no clearance. This configuration suppresses the pad 5 from moving and causing an abnormal noise (rattling noise) by the braking torque.

The mounting ear portions 6B and 6C of the pad 5 are slidably inserted and fit in the guide portions 3, 3 located on the turn-in side and on the turn-out side of the disc 1 via the guide plates 23 of the pad springs 19 and are biased outward in the radial direction of the disc 1 by the respective radial direction biasing plates 24. This configuration enables the mounting ear portions 6B and 6C of the pad 5 to be elastically pressed toward the outside portions 23A of the guide plates 23 (toward the outside faces in the radial direction of the disc 1).

This configuration enables the radial direction biasing plates 24 of the pad springs 19 to suppress the pad 5 from rattling in the radial direction of the disc 1 due to vibration or the like during a vehicle run. At the time of a brake operation, this configuration smoothly guides the pad 5 on the inner side and the pad 5 on the outer side along the guide plates 23 in the axial direction of the disc 1, while holding the mounting ear portions 6B and 6C of the pads 5 to be slidably in contact with the outside portions 23A-side of the guide plates 23.

In an assembling operation of the disc brake or in replacement of the pad 5, the pad 5 is assembled to the mounting member 2 with the pad spring 19 attached thereto, in the state that the spring assembly 10 (including the return spring 11 and the side pressure spring 16) is attached to the projection 8 on the mounting ear portion 6C-side of the pad 5. In the pad spring used in the related art configuration described above, on the other hand, a return spring fall-preventing mechanism configured to prevent a fall of the return spring is significantly protruded in the axial direction of the disc 1. Accordingly, in the process of assembling the pad to the mounting member, the return spring on the pad side is likely to interfere with the return spring fall-preventing mechanism on the pad spring side. This may reduce the workability of the operation of assembling the pad to the mounting member.

Furthermore, in the pad spring of the related art, the abutting portion which the leading end of the return spring abuts on and the guide portion serving to facilitate mounting of the pad to the mounting member in the pad assembling process are provided separately. This is likely to increase the material width of the pad spring and complicate processing of the pad spring.

In the pad spring 19 used for the disc brake according to the first embodiment, the folded region 25 including the abutting portion 25B configured to abut on the curved portion 15 of the return spring 11 is formed by bending the leading end side of the guide projection 25A (protruded end side in the axial direction of the disc 1), which serves to guide the mounting ear portion 6B or 6C toward the guide portion 3, outward in the radial direction of the disc 1. In other words, the folded region 25 of the pad spring 19 is formed by bending the leading end side of the guide projection 25A that is protruded from the guide plate 23 outward in the radial direction of the disc 1.

This configuration enhances the degree of freedom in the shape of the abutting portion 25B of the folded region 25 and provides the abutting portion 25B having the area required for the contact with the curved portion 15 of the return spring 11. This accordingly improves the yield of the pad spring 19 and thereby reduces the cost of the disc brake. Additionally, this configuration reduces the possible interference of a plurality of pad springs 19 when they are stacked on one another, and thus suppresses deformation of the pad springs 19 during transportation of components.

Additionally, the folded region 25 is configured to include the first side bent portion 26 that is bent and protruded from the outside end 25B1 of the abutting portion 25B toward the side way from the disc 1 in the axial direction of the disc 1. The flat plate 21 is configured to include the axial direction protruded portion 27 that is opposed to the first side bent portion 26 across the abutting portion 25B of the folded region 25. The curved portion 15 of the return spring 11 abuts on the abutting portion 25B of the folded region 25, so that the return spring 11 elastically deforms the second extended portion 14 and continuously biases the pad 5 in the return direction away from the disc 1. In this state, the curved portion 15 of the return spring 11 is placed between the first side bent portion 26 and the axial direction protruded portion 27 to abut on the abutting portion 25B of the folded region 25.

For example, even when the elastic deformation of the return spring 11 is increased by the wear of the lining 7, the first side bent portion 26 and the axial direction protruded portion 27 serve to suppress the curved portion 15 of the return spring 11 from coming off from the abutting portion 25B. Additionally, the first side bent portion 26 and the axial direction protruded portion 27 serve to restrict the motion of the curved portion 15, even when an external force is applied to the return spring 11 to move the curved portion 15 on the abutting portion 25B during, for example, assembly of the disc brake to the vehicle or during transportation of the disc brake. This configuration accordingly suppresses the curved portion 15 from coming off from the abutting portion 25B and thereby improves the reliability and the safety of the disc brake.

The abutting portion 25B of the folded region 25 is formed by bending the leading end side of the guide projection 25A (protruded end in the axial direction of the disc 1) outward in the radial direction of the disc 1. When the curved portion 15 of the return spring 11 abuts on the abutting portion 25B of the folded region 25, this configuration causes the folded region 25 to be elastically deformed inward in the axial direction of the disc 1 (i.e., toward the side approaching the disc 1) by the reactive force from the curved portion 15. Accordingly, the folded region 25 applies the biasing force to the pad 5 via the return spring 11 and plays an auxiliary role when the pad 5 is separated away from the disc 1.

The guide plate 23 provided on the folded region 25 allows for downsizing of the pad spring 19 as a whole. This reduces the possibility of interference with another member in the process of mounting the pad spring 19 to the mounting member 2. This accordingly improves the workability of the operation of mounting the pad spring 19 to the mounting member 2.

The first side bent portion 26 and the axial direction protruded portion 27 are arranged on the respective sides in the circumferential direction of the disc 1 across the curved portion 15 of the return spring 11. Accordingly, the first side bent portion 26 and the axial direction protruded portion 27 are placed close to the abutting portion 25B of the folded region 25. This configuration provides the space for placing the return spring 11 on the more outside in the axial direction of the disc 1 than the folded region 25. This configuration enhances the degree of freedom in the shape of the return spring 11. This configuration also suppresses the return spring 11 from interfering with the first side bent portion 26 and the axial direction protruded portion 27 in the process of assembling the pad 5 to the mounting member 2. This accordingly improves the workability of the operation of assembling the pad 5 to the mounting member 2.

Figure 12:
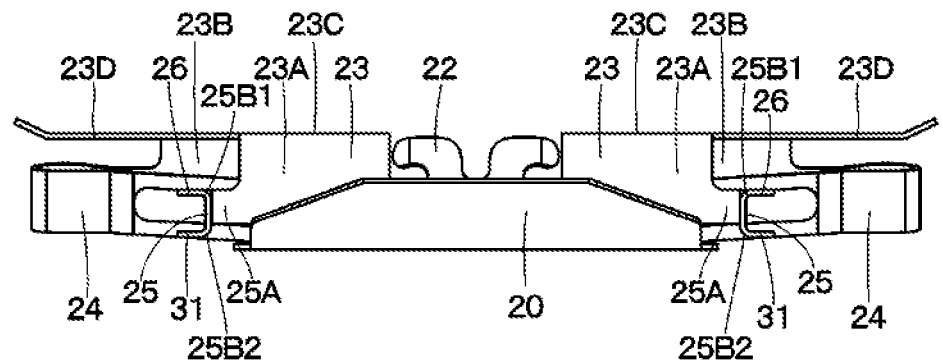
FIG. 12 is a plan view illustrating a pad spring according to a second embodiment, viewed from the same direction as that of FIG. 7.
Figure 13:
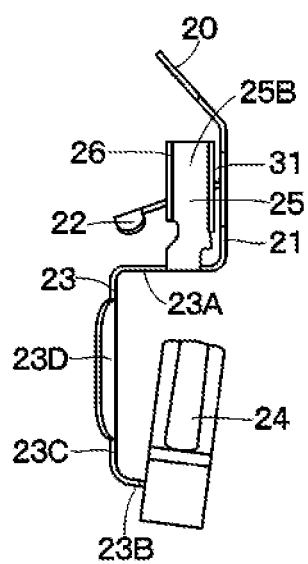
FIG. 13 is a side view illustrating the pad spring, viewed from the same direction as that of FIG. 8.
Figure 14:
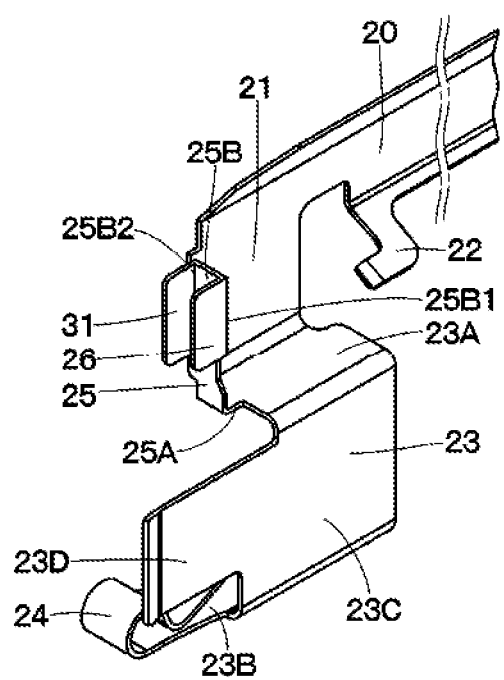
FIG. 14 is a perspective view illustrating the pad spring, viewed from the same direction as that of FIG. 10.

FIGS. 12 to 14 illustrate a second embodiment of the present invention. This embodiment is characterized by a second side bent portion provided in an abutting portion at an end close to the disc circumferential center of the pad 5 (hereinafter referred to as inside in the circumferential direction) in the disc circumferential direction. The like components of this embodiment to those of the first embodiment are expressed by the like reference signs and are not specifically described here.

A second side bent portion 31 is formed by bending an abutting portion 25B at an inside end 25B2 (abutting surface end) on the inside in the circumferential direction of the disc 1. This second side bent portion 31 is configured as the side bent portion according to this embodiment and is used in place of the axial direction protruded portion 27 of the first embodiment. The second side bent portion 31 is bent and extended from the inside end 25B2 of the abutting portion 25B toward the side away from the disc 1 in the axial direction of the disc 1, so as to be opposed to the first side bent portion 26. In the state that the curved portion 15 of the return spring 11 abuts on the abutting portion 25B, the second side bent portion 31 is located on the inside of the curved portion 15 in the circumferential direction of the disc 1. In other words, the curved portion 15 of the return spring 11 is placed between the first side bent portion 26 and the second side bent portion 31 to abut on the abutting portion 25B.

This configuration suppresses the curved portion 15 of the return spring 11 from coming off from the inside of the abutting portion 25B in the circumferential direction of the disc 1, for example, when the return spring 11 is elastically deformed by the wear of the lining 7. This configuration also suppresses the curved portion 15 of the return spring 11 from coming off from the abutting portion 25B by the contact with the second side bent portion 31, even when an external force is applied to the return spring 11, for example, during assembly or transportation of the disc brake.

Like the first embodiment, the configuration of the second embodiment accordingly suppresses the curved portion 15 of the return spring 11 from coming off from the abutting portion 25B and thereby improves the reliability and the safety of the disc brake.

The embodiment described above employs the so-called integral pad spring 19 configured to include the guide plates 23, the radial direction biasing plates 24 and the like respectively provided on the inner side and the outer side of the disc 1. This configuration is, however, not restrictive. For example, two pad springs may be formed in shapes by splitting the pad spring into the inner side and the outer side of the disc and may be placed respectively on the inner side and on the outer side of the disc.

According to the embodiment described above, the radial direction biasing plate 24 is provided on the second wall portion 3C-side of the guide plate 23 (the inside portion 23B of the guide plate 23) to press the mounting ear portion 6C toward the first wall portion 3B, and the folded region 25 is provided on the first wall portion 3B-side of the guide plate 23 (the outside portion 23A of the guide plate 23). This configuration is, however, not restrictive. According to a modification, the radial direction biasing plate 24 may be provided on the first wall portion 3B-side of the guide plate 23 to press the mounting ear portion 6C toward the second wall portion 3C, and the folded region 25 may be provided on the second wall portion 3C-side of the guide plate 23.

According to the embodiment, the mounting ear portions 6B and 6C are provided to be protruded on the respective sides in the rotating direction of the pad 5. According to a modification, a mounting ear portion may be provided to be protruded only on a single side in the rotating direction. According to the embodiment, the pad spring 19 is provided with the radial direction biasing plate 24 serving as the first biasing member. According to a modification, a pad may be provided with a first pressing member.

According to the embodiment, the flat plate 21 extended outward in the radial direction of the disc 1 is provided to be coupled with the first wall portion 3B-side of the guide plate 23 (the outside portion 23A of the guide plate 23) and is provided with the axial direction protruded portion 23C. According to a modification, a flat plate extended inward in the radial direction of the disc 1 may be provided to be coupled with the second wall portion 3C-side of the guide plate 23 (the inside portion 23B of the guide plate 23) and may be provided with an axial direction protruded portion.

According to the embodiment described above, the spring assembly 10 (including the return spring 11 and the side pressure spring 16) is configured as a leaf spring made of a metal plate. This configuration is, however, not restrictive. Any of various springs, for example, a spring made of a material other than the metal plate (for example, a resin material) or a wire spring made of a material other than the plate material (for example, a wire rod) may be employed for the return spring or the side pressure spring.

The embodiment described above is configured such that one piston is provided in the inner leg portion 4A of the caliper 4. This configuration is, however, not restrictive. One example may employ a twin-bore configuration having two pistons that are provided in the inner leg portion of the caliper. Another example may employ a configuration having three or more pistons that are provided in the inner leg portion of the caliper.

The above embodiment describes the so-called floating caliper-type disc brake configured such that the piston is slidably provided in the inner leg portion 4A of the caliper 4 via the cylinder and that the outer leg portion 4C of the caliper 4 abuts on the pad 5 on the outer side. This configuration is, however, not restrictive. For example, the present invention may be applied to a so-called opposed piston-type disc brake configured such that pistons are provided respectively on an inner side and on an outer side of a caliper.

A disc brake based on the above embodiments may be configured, for example, in any of aspects described below. According to a first aspect, there is provided a disc brake including a mounting member that is mounted to a non-rotary part of a vehicle and that is formed across an outer circumferential side of a disc; a caliper that is mounted to the mounting member and that is formed across the outer circumferential side of the disc; a pad that is pressed against the disc by a movable portion of the caliper and that includes a mounting ear portion provided to be protruded in a longitudinal direction of the pad; a pad spring that includes a guide plate configured to guide the mounting ear portion, and a first biasing member configured to press the mounting ear portion of the pad toward outside of the disc; and a second biasing member that is provided at the pad to bias the pad in a direction away from the disc. The guide plate of the pad spring has a surface that abuts on the mounting ear portion of the pad pressed by the first biasing member. The pad spring includes a folded region that is protruded in an axial direction of the disc from the surface abutting on the mounting ear portion of the pad and that is folded in a direction toward the outside of the disc and away from the mounting ear portion. The folded region includes an abutting portion which the second biasing member provided at the pad abuts on.

In a second aspect of the disc brake according to the first aspect, the pad spring further includes a flat plate that is coupled with the guide plate and that is extended toward outside of the disc. The flat plate includes an axial direction protruded portion that is protruded in the axial direction of the disc. The axial direction protruded portion is located at a position closer to a center of the pad than the abutting portion in a circumferential direction of the disc.

In a third aspect of the disc brake according to the second aspect, the axial direction protruded portion is protruded to a position that is further away from the disc than the abutting portion in the axial direction of the disc.

In a fourth aspect of the disc brake according to any of the first to the third aspects, the pad spring includes a side bent portion that is extended from an abutting surface end of the abutting portion away from the disc in the axial direction of the disc.

The foregoing describes some embodiments of the present invention. Such embodiments of the present invention described above are, however, for the purpose of facilitating the understanding of the present invention and are not intended to limit the present invention. The present invention may be modified or improved without departing from the scope of its spirit and naturally includes equivalents thereof. In the scope of solving at least part of the problems described above or in the scope of achieving at least part of the advantageous effects, any combination or omission of any of the respective components described in the claims and in the description hereof may be allowed.

The present application claims priority to Japanese patent application No. 2015-230673 filed on Nov. 26, 2015. The entirety of the disclosure including the description, the claims, the drawings and the abstract of Japanese patent application No. 2015-230673 filed on Nov. 26, 2015 is hereby incorporated by reference into this application.

REFERENCE SIGNS LIST 1 disc, 2 mounting member, 4 caliper, 5 pad, 6B and 6C mounting ear portions, 11 return spring (second biasing member), 19 pad spring, 21 flat plate, 23 guide plate, 24 radial direction biasing plate (first biasing member), 25 folded region, 25B abutting portion, 25B1 outside end (abutting surface end), 25B2 inside end (abutting surface end), 26 first side bent portion (side bent portion), 27 axial direction protruded portion, 31 second side bent portion (side bent portion)

The invention claimed is:
1. A disc brake comprising:
a mounting member mounted to a non-rotary part of a vehicle and formed across an outer circumferential side of a disc;
a caliper mounted to the mounting member and formed across the outer circumferential side of the disc;
a pad pressed against the disc by a movable portion of the caliper and including a mounting ear portion provided to be protruded in a longitudinal direction of the pad;
a pad spring including a guide plate configured to guide the mounting ear portion, and a first biasing member configured to press the mounting ear portion of the pad toward an outside of the disc; and
a second biasing member provided at the pad to bias the pad in a direction away from the disc, wherein the guide plate of the pad spring has a surface that abuts on the mounting ear portion of the pad pressed by the first biasing member, the pad spring includes a folded region provided on an outside portion of the guide plate abutting on the mounting ear portion of the pad, the folded region including:
- a guide projection that is extended from the end of the outside portion of the guide plate toward the side away from the disc in the axial direction of the disc; and
- an abutting portion that is folded from a leading end of the guide projection outward in a radial direction of the disc and away from the mounting ear portion, wherein the second biasing member provided at the pad abuts on the abutting portion.

2. The disc brake according to claim 1,
wherein the pad spring further includes a flat plate coupled with the guide plate and extended toward the outside of the disc, the flat plate includes an axial direction protruded portion that is protruded in the axial direction of the disc, and the axial direction protruded portion is located at a position closer to a center of the pad than the abutting portion in a circumferential direction of the disc.

3. The disc brake according to claim 2, wherein the axial direction protruded portion is protruded to a position that is further away from the disc than the abutting portion in the axial direction of the disc.

4. The disc brake according to claim 2, wherein the pad spring includes a side bent portion extended from an abutting surface end of the abutting portion away from the disc in the axial direction of the disc, wherein the axial direction protruded portion is opposed to the side bent portion across the abutting portion, and the second biasing member includes a curved portion that abuts on the abutting portion, whereby the curved portion of the return spring is suppressed from coming off from the abutting portion by the contact of the curved portion with the axial direction protruded portion, even when an external force is applied to the return spring.

5. The disc brake according to claim 2, wherein the pad spring includes a side bent portion extended from an abutting surface end of the abutting portion away from the disc in the axial direction of the disc.

6. The disc brake according to claim 3, wherein the pad spring includes a side bent portion extended from an abutting surface end of the abutting portion away from the disc in the axial direction of the disc.

7. The disc brake according to claim 1, wherein the folded region is formed by the guide projection and the abutting portion.

8. The disc brake according to claim 7, wherein the folded region is formed in a generally L shape by the guide projection and the abutting portion, and thereby, when the curved portion of the return spring abuts on the abutting portion, the folded region is elastically deformed in the axial direction of the disc.

* * * * *